UNITED STATES PATENT OFFICE.

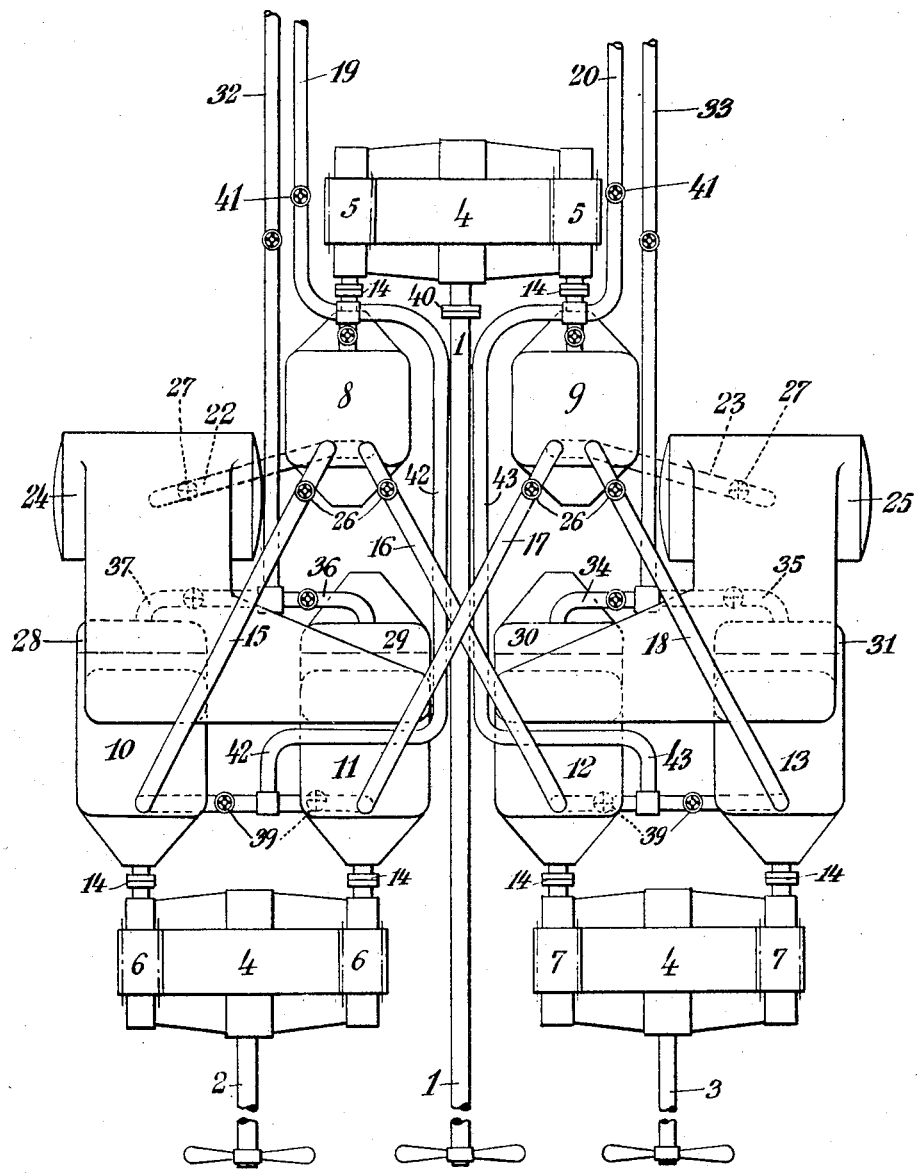

JAMES C. SHAW, OF PHILADELPHIA, PENNSYLVANIA, ASSIGNOR TO THE WILLIAM CRAMP & SONS SHIP & ENGINE BUILDING COMPANY, A CORPORATION OF PENNSYLVANIA.

MARINE-TURBINE PROPULSION.

1,235,937. Specification of Letters Patent. Patented Aug. 7, 1917.

Application filed March 23, 1916. Serial No. 86,092.

*To all whom it may concern:*

Be it known that I, JAMES C. SHAW, a citizen of the United States, residing at Philadelphia, in the county of Philadelphia and State of Pennsylvania, have invented certain new and useful Improvements in Marine-Turbine Propulsion, of which the following is a full, clear, and exact specification.

This invention relates to marine turbine propulsion and has for its object to provide a system of compounded turbines of separate units in order to improve the economy both at full and reduced powers. The invention is especially applicable to naval vessels, which require to have provision for maximum speed with economy of fuel consumption, and are also required to operate for considerable periods at reduced speeds with also utmost economy.

A further object of the invention is to provide a turbine installation in which the various units can economically operate at high speed, and so arranged that they can be operated independently of each other in case of failure of one or more parts comprising the system.

A further object is to provide a combination of high and low pressure turbine units geared to a plurality of propeller shafts, whereby the various parts will have a maximum amount of interchangeability in order to reduce to a minimum the number of spare parts required to be carried in stock at the yard, or on board the vessel. By the provision of geared connections between the high and low pressure units and the propulsion shafts, it is possible to make the parts of the several units more nearly alike, while the greater subdivision of the units, together with a novel system of power connections between the several units, reduces to a minimum the possibility of complete disablement of the plant, and also permits various connections capable of securing utmost economy, at various powers.

The invention is shown diagrammatically in the accompanying drawings, wherein—

1, 2 and 3 are the propeller shafts, 1 being the center shaft, and 2 and 3 being wing shafts, each carrying a gear 4 with each of which mesh two pinions 5, 5, 6, 6, and 7, 7. The pinions 5, 6, 7 are connected to their respective turbines 8, 9, 10, 11, 12, 13, through flexible couplings 14. The high pressure turbine is made up of units 8 and 9, which exhaust by pipes 15, 16, 17, 18, into the ahead ends of the units 10, 11, 12, 13, of the low pressure turbines on shafts 2 and 3, respectively. The high pressure turbines take steam independently of each other through pipes 19, 20. The two low pressure units driving separate wing shafts take fluid pressure in common from one high pressure unit in such way that the power delivered to the wing shafts is automatically the same at all speeds, whether all the units or only a part thereof are in operation. The high pressure units can be operated for maneuvering purposes in an ahead direction independent of the low pressure turbines, by exhausting through connections 22, 23, to condensers 24, 25, when valves 26 are closed and valves 27 opened.

Reverse driving is effected by providing the units of each low pressure turbine 10, 11, and 12, 13, with reverse stages at ports 28, 29, 30, 31, supplied by pipes 32, 33, 34, 35, 36, 37. If it is desired to run the low pressure turbines independently, in case of break down of the high pressure turbine, the latter can be disconnected at coupling 40. In case of breakdown of the high pressure units, or their gearing, the ahead ends of the low pressure turbines can be supplied with fluid pressure independently of the high pressure turbine through pipes 42, 43.

In the usual turbine direct connected three shaft installation having only two low pressure turbines, each driving a wing shaft, it is necessary to greatly increase the fluid velocity through the last exhaust blades, or else the blades become too long. This increase of velocity in exhaust blading reduces the efficiency, and renders it impossible to obtain full advantage from the high vacuums now attainable. By making each low pressure turbine into two units, making four in all, the blades at the exhaust ends can be designed with sufficient channel area to obtain the best efficiency for the high vacuums now employed. This also permits of a more rugged design of blades, since by reason of shorter permissible lengths and reduced centrifugal stresses they are not so highly strained at their roots.

Conversely in such prior three shaft arrangements, at reduced powers with all low pressure and high pressure turbines in operation the efficiency is reduced, due to excess area in blades at exhaust end, and the bad distribution of pressures at the high pressure end. Accordingly the efficiency is improved, as can be understood by any one versed in the art, by being able to reduce by one-half the number of working units.

By the three shaft arrangement just described, embodying four low pressure units, together with the cross connections shown, it will be seen that the power delivered, as for example half power, will be always approximately equally divided between the two wing shafts, which is a feature of much advantage. This advantage holds good whether one or both high pressure units are employed at either fractional or full power. The proportion of the power developed by the high pressure and low pressure units can, of course, be determined according to the conditions of the particular installation.

By the foregoing arrangement, it is possible to make the various parts of the high and low pressure units and parts of gears much more interchangeable than has heretofore been possible, and owing to the subdivision of the high and low pressure turbines into several units, they are capable of being cross connected and subdivided so as to obtain a number of varied powers, but always operating the units which are used at or near their best blade and fluid velocity, thereby obtaining a high degree of efficiency. By the arrangement of this invention, the gears and pinions can be duplicates, which will make a great saving and convenience in the stock required to be carried, and in replacements. The arrangement herein is diagrammatic only, and in practice various changes and modifications can be made, and one or more shafts can be omitted without departing from the scope of the appended claims.

Having thus described my invention, what I declare as new and desire to secure by Letters Patent of the United States is:—

1. In a marine turbine installation, a high pressure turbine comprising two intergeared high pressure units, a low pressure turbine comprising two intergeared units respectively in series therewith, and propelling means driven by said high and low pressure turbines.

2. In a marine turbine installation, a high pressure turbine comprising intergeared high pressure units, a low pressure turbine comprising intergeared low pressure units, a connection from each high pressure unit to one of said low pressure units, and propelling means driven by said high and low pressure turbines.

3. In a marine turbine installation, a high pressure turbine comprising two intergeared high pressure units, a low pressure turbine comprising two intergeared low pressure units, means for conducting exhaust from said high pressure turbine to said low pressure turbine, and propelling means driven by said high and low pressure turbines.

4. In a marine turbine installation, a high pressure turbine comprising two separate high pressure units connected in parallel and intergeared to drive a common shaft, a plurality of low pressure units supplied by exhaust from said high pressure turbine, and propelling mechanism driven by said high and low pressure turbines.

5. In a marine turbine installation, a high pressure turbine comprising separate high pressure units connected in parallel and intergeared to drive a common shaft, a plurality of low pressure units supplied by exhaust from said high pressure turbine, and propelling mechanism including a plurality of shafts driven by said high and low pressure turbines.

6. In a marine turbine installation, a high pressure turbine comprising two high pressure units in steam parallel, a propulsion shaft geared to each of said units, a low pressure turbine driven by exhaust from said high pressure turbine, and a second propulsion shaft driven thereby.

7. In a marine turbine installation, a high pressure turbine comprising two high pressure units in steam parallel, a propulsion shaft geared to each of said units, a low pressure turbine comprising two units driven by exhaust from said high pressure turbine, and a second propulsion shaft geared to each of said low pressure units to be driven thereby.

8. In a marine turbine installation, a high pressure ahead turbine comprising two high pressure units in steam parallel, a propulsion shaft geared to each of said units, a low pressure turbine having ahead stages driven by exhaust from said high pressure ahead turbine, reverse stages in said low pressure turbine having an independent source of fluid pressure, and a second propulsion shaft driven thereby.

9. In a marine turbine installation, a high pressure ahead turbine comprising two high pressure units in steam parallel, a propulsion shaft geared to each of said units, a low pressure turbine comprising separate units each having ahead stages driven by exhaust from said high pressure ahead turbine, reverse stages in each of said low pressure turbines and having a source of fluid pressure, and a second propulsion shaft driven thereby.

10. In a marine turbine installation, a high pressure ahead turbine comprising two high pressure units, a propulsion shaft geared to each of said units, a low pressure turbine comprising separate units each having ahead stages connected in series with one of said high pressure units, reverse stages in each of said low pressure units having a source of fluid pressure, and a second propulsion shaft driven thereby.

11. In a geared marine turbine installation, having three shafts driven by gears, and two pinions per gear, an arrangement of two high pressure turbines driving center screw exhausting each to two low pressure turbines driving wing screws.

12. In a marine turbine installation comprising three shafts, a pair of high pressure turbines geared to one of said shafts, a low pressure turbine geared to each of said other shafts, and connections from the exhaust of each high pressure turbine to one of said low pressure turbines.

13. In a marine turbine installation comprising three shafts, a pair of high pressure turbines geared to one of said shafts, a pair of low pressure turbines geared to each of the other two shafts, and a connection from each high pressure turbine to one low pressure turbine of each pair.

14. In a marine turbine installation comprising three shafts, a high pressure turbine driving one shaft, a double unit low pressure turbine driving each of the other shafts, and separate, parallel connections from said high pressure turbine to each unit of the low pressure turbine.

15. In a marine turbine installation comprising three shafts, a high pressure double unit turbine driving one shaft, a double unit low pressure turbine driving each of the other shafts, and connections from the exhaust of each high pressure unit to a unit of each low pressure turbine.

16. In a marine turbine installation comprising three shafts, a high pressure double unit turbine geared to the center shaft, a double unit low pressure turbine geared to each of the wing shafts, a connection from the exhaust of each high pressure unit to a unit of each low pressure turbine, and means for cutting out one high pressure unit and its connected low pressure units at reduced power.

17. In a marine turbine installation comprising three shafts, a high pressure double unit turbine driving the center shaft, a double unit low pressure turbine driving each of the wing shafts, a connection from the exhaust of each high pressure turbine to a unit of each low pressure turbine, and means for cutting out one high pressure unit and its connected low pressure units at reduced power.

18. In a marine installation, the combination with a plurality of shafts, of a double unit high pressure turbine having each of its units separately geared to one of said shafts, and a double unit low pressure turbine having each unit in series with one of said high pressure units and both geared to one shaft.

19. In a marine turbine installation comprising a center and two wing shafts, a high pressure ahead turbine driving the center shaft, and double unit low pressure turbines respectively for driving said wing shafts, each unit thereof having an ahead stage supplied by exhaust from said ahead turbine, and separately supplied reversing units for driving each of said wing shafts.

20. In a marine turbine installation comprising a center and two wing shafts, a high pressure turbine comprising two units each geared to said center shaft, and a low pressure ahead and reversing turbine for each wing shaft, each comprising two units geared to the shaft, means for supplying the ahead portions of each low pressure turbine from the exhaust of said high pressure turbine, and means for separately supplying the reverse portions of said low pressure turbines.

21. In a marine turbine installation comprising three shafts, a high pressure ahead turbine comprising two units each geared to one of said shafts, a low pressure turbine comprising two units each consisting of an ahead and a reversing turbine geared to each of the remaining shafts, an ahead connection from the exhaust end of each high pressure unit to the ahead end of one unit of each low pressure turbine, and separate supply means for said reversing turbines.

22. In a marine turbine installation comprising a center and two wing shafts, a divided high pressure turbine driving the center shaft, two divided low pressure turbines each driving a respective wing shaft by exhaust from said high pressure turbine, and a connection from each division of said high pressure turbine to each division of each low pressure turbine arranged so that when the power of said high pressure turbine is varied the power on said wing shafts remains equally divided.

23. In a marine turbine installation comprising a center and two wing shafts, a divided high pressure turbine driving the center shaft, two divided low pressure turbines each driving a respective wing shaft by exhaust from said high pressure turbine, and a connection from each division of said high pressure turbine to each division of each low pressure turbine arranged so that when the power of said high pressure turbine is varied the power on said wing shafts remains equally divided, and a reversing turbine on each wing shaft having a separate supply.

24. In a marine turbine installation comprising a high pressure turbine driven shaft, and two low pressure turbine driven shafts, a high pressure variable power turbine comprising two high pressure units, a low pressure turbine for driving each remaining shaft comprising two low pressure units, and connections from each high pressure unit to one unit of each low pressure turbine arranged so that when a high pressure unit is cut out for reduced power, the power on said latter shafts remains equally divided.

25. In a marine turbine installation comprising a high pressure turbine driven shaft, and two low pressure turbine driven shafts, a high pressure variable power turbine comprising two high pressure units geared to one shaft by a common pinion, a low pressure turbine for driving each remaining shaft comprising two low pressure units, each geared to its shaft by a common pinion, and connections from each high pressure unit to one unit of each low pressure turbine arranged so that when a high pressure unit is cut out for reduced power, the power on said latter shafts remains equally divided.

26. In a marine turbine installation, a center shaft, two wing shafts, each of said three shafts having a gear wheel, two high pressure turbine units with respective pinions engaging the gear wheel on the center shaft and four low pressure turbine units with respective pinions, two of said last mentioned pinions engaging the gear wheel on one wing shaft and the remaining two engaging the gear wheel on the other wing shaft, all six of said pinions being interchangeable.

27. In a geared marine turbine installation, having three shafts driven by gears with two pinions each and connected to two high pressure turbines driving center shaft and four low pressure turbines driving wing shafts, a combination of turbines whereby one half of the ahead units may be cut out at one half ahead power and less.

28. In a geared marine turbine installation, having a center shaft and two wing shafts driven by gears with two pinions each, two high pressure turbines driving center shaft and four low pressure turbines, two of them driving each wing shaft, four independent reverse turbines contained in exhaust casings of four low pressure ahead turbines and operative in parallel.

29. In a marine turbine installation, a high pressure turbine comprising intergeared high pressure units, a low pressure turbine comprising intergeared low pressure units, a connection from each high pressure unit to one of said low pressure units, and propelling means driven by said high and low pressure turbines, the high and low pressure turbines developing approximately equal power.

30. In a marine turbine installation, a high pressure turbine comprising intergeared high pressure units, a low pressure turbine comprising intergeared units respectively in series therewith, and propelling means driven by said high and low pressure turbines, said low pressure turbine including reversing means.

31. In a marine turbine installation, a high pressure turbine comprising intergeared high pressure units, a low pressure turbine comprising intergeared units respectively in series therewith, a condenser connected to said low pressure turbine, and propelling means driven by said high and low pressure turbines.

32. In a geared marine turbine installation, having three shafts driven by gears, and two pinions per gear, an arrangement of two high pressure turbines driving center screw exhausting each to two low pressure turbines driving respective wing screws, and a separate condenser connected to each pair of low pressure turbines.

33. In combination, a center propeller shaft, a wing shaft on each side, two high pressure turbine units geared to the center shaft, two low pressure turbine units geared to each wing shaft, and steam conduits from each high pressure unit to low pressure units associated with both wing shafts.

34. In combination, a center propeller shaft, two wing shafts, one on each side, two high pressure turbine units geared to the center shaft, four low pressure turbine units, two of them geared to each wing shaft, a steam conduit from each high pressure unit to a low pressure unit associated with a wing shaft on one side and another steam conduit from each high pressure unit to a low pressure unit associated with the wing shaft on the other side.

In testimony whereof I affix my signature, in presence of two witnesses.

JAMES C. SHAW.

Witnesses:
GEORGE M. SPEAR,
J. H. McMASTER.

Copies of this patent may be obtained for five cents each, by addressing the "Commissioner of Patents, Washington, D. C."